(12) United States Patent
Nikander

(10) Patent No.: US 12,098,056 B2
(45) Date of Patent: Sep. 24, 2024

(54) ELEVATOR

(71) Applicant: Kone Corporation, Helsinki (FI)

(72) Inventor: Juhamatti Nikander, Helsinki (FI)

(73) Assignee: Kone Corporation, Helsinki (FI)

( * ) Notice: Subject to any disclaimer, the term of this patent is extended or adjusted under 35 U.S.C. 154(b) by 1447 days.

(21) Appl. No.: 16/449,670

(22) Filed: Jun. 24, 2019

(65) Prior Publication Data

US 2020/0010302 A1 Jan. 9, 2020

(30) Foreign Application Priority Data

Jul. 4, 2018 (EP) .................................... 18181612

(51) Int. Cl.
*B66B 1/32* (2006.01)
*B66B 1/34* (2006.01)
(Continued)

(52) U.S. Cl.
CPC .............. *B66B 1/32* (2013.01); *B66B 1/3492* (2013.01); *B66B 5/00* (2013.01); *B66B 5/02* (2013.01); *H02P 3/24* (2013.01)

(58) Field of Classification Search
CPC ........... B66B 1/32; B66B 1/3492; B66B 5/00; B66B 5/02; B66B 5/0031; H02P 3/24; H02P 27/085; B66D 5/30
See application file for complete search history.

(56) References Cited

U.S. PATENT DOCUMENTS

2015/0210506 A1  7/2015  Kattainen et al.

FOREIGN PATENT DOCUMENTS

| CN | 101367479 A | 2/2009 |
|---|---|---|
| CN | 101663219 A | 3/2010 |

(Continued)

OTHER PUBLICATIONS

European Search Report (EPO Form 1507N) for European Application No. EP18181612 dated Jan. 4, 2019.
(Continued)

*Primary Examiner* — Jeffrey Donels
(74) *Attorney, Agent, or Firm* — Harness, Dickey & Pierce, P.L.C.

(57) ABSTRACT

An elevator may include an elevator motor driving at least one elevator car in a hoisting path, which elevator motor is driven via a frequency converter controlled by a control device of the elevator. The frequency converter includes a rectifier bridge and an inverter bridge and a DC link in-between. The elevator further includes at least one elevator brake acting on a brake element rotating with the rotor of the elevator motor, which elevator brake is driven via a brake drive which is connected to the DC link of the frequency converter an comprises a DC/DC converter having its primary side connected to the DC link and its secondary side connected to a brake circuit comprising at least one brake coil of the elevator brake and at least one rectifying element. In the primary side of the DC/DC converter, a first semiconductor switch is connected which is controlled by the control device of the elevator. In the brake circuit a second semiconductor switch is connected which is also controlled by the control device of the elevator, whereby an earth fault indication circuit is connected between the brake circuit and earth. The earth fault indication circuit includes an transmitting part of an opto-coupler, which opto-coupler has its sensor part connected to an earth fault transmission circuit connected to the control device of the elevator. The control device is configured to control the first and/or second semiconductor switch depending on the signal of the earth fault transmission circuit.

20 Claims, 1 Drawing Sheet

(51) Int. Cl.
*B66B 5/00* (2006.01)
*B66B 5/02* (2006.01)
*H02P 3/24* (2006.01)

(56) References Cited

FOREIGN PATENT DOCUMENTS

| | | | |
|---|---|---|---|
| CN | 104364177 A | 2/2015 | |
| CN | 104768861 A | 7/2015 | |
| EP | 2174411 A1 | 4/2010 | |
| EP | 3258277 A1 | 12/2017 | |
| EP | 3590879 A1 * | 1/2020 | ............... B66B 1/32 |
| JP | H05328739 A | 12/1993 | |
| JP | 2009/046231 A | 3/2009 | |
| JP | 2009115754 A | 5/2009 | |
| WO | WO-2008139567 A1 | 11/2008 | |
| WO | WO-2013178872 A1 | 12/2013 | |
| WO | WO-2014068194 A1 | 5/2014 | |

OTHER PUBLICATIONS

Search Report issued Aug. 1, 2022 in Chinese Patent Application No. 2019105943211.

* cited by examiner

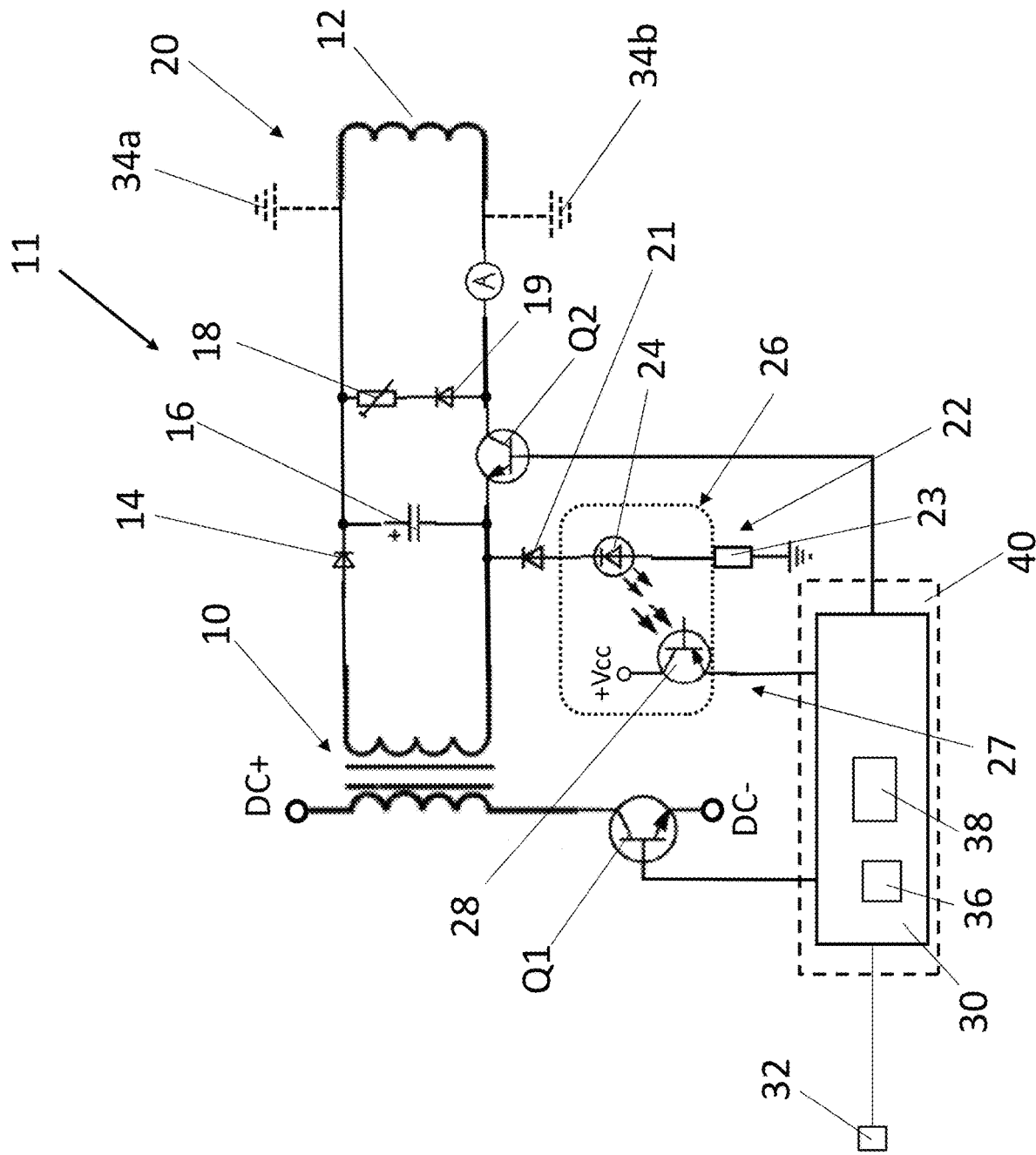

ELEVATOR

CROSS-REFERENCE TO RELATED APPLICATIONS

This application claims priority to European Patent Application No. 18181612.5, filed on Jul. 4, 2018, the entire contents of which are incorporated herein by reference.

FIELD OF THE INVENTION

The present invention relates to an elevator comprising an elevator motor driving at least one elevator car in a hoisting path.

BACKGROUND OF THE INVENTION

The elevator motor is driven via a frequency converter controlled by a control device of the elevator. The frequency converter comprises a rectifier bridge and an inverter bridge as well as DC link in between. The elevator further comprises at least one elevator brake acting on a brake disc rotating with the rotor of the elevator motor, for example a brake pad. Usually, at least two brakes are provided for each elevator motor according to common safety regulations. The elevator brake is driven via a brake drive which is connected to the DC link of the frequency converter and comprises a galvanically separating link element, e.g. a DC/DC converter or controller, having its primary side connected to the DC link and a secondary side connected to at least one brake coil of the elevator brake via at least one rectifying element, e.g. a diode. The whole circuit of the secondary side of the galvanically separating link element together with the brake coil and the components connected serially or in parallel form the brake circuit. Such types of elevators are per se known in the art and have the advantage that the energy for the elevator brakes is taken from the DC link of the frequency converter so that no separate energy supply has to be provided for the elevator brake drive. In this connection, it has to be mentioned that regularly the energization of the brake means that the brake opens and the cutting off of the current in the brake circuit means that the brake is gripping the brake element connected to the rotor of the elevator motor.

SUMMARY

It is object of the invention to provide an earth fault detection of the brake circuit for such type of elevator, which is economical and easy to install.

The object is solved with an elevator according to example embodiments.

According to the invention, in the primary side of the galvanically separating link element, particularly of the DC/DC converter, a first semiconductor switch is connected which is controlled by a control device of the elevator which could also be a safety device of the elevator. Preferably, this first semiconductor switch is PWM modulated. In the brake circuit, a second semiconductor switch is connected, particularly in series with the brake coil, which is also controlled by the control device of the elevator. Furthermore, according to the invention, an earth fault indication circuit is connected between the brake circuit and earth, which earth fault indication circuit comprises an emitting or transmitting part of a galvanically isolating transmission element, particularly an LED of an opto-coupler. Anyway, also a DC/DC converter or transformer and the like may be used as galvanically isolating transmission element. The galvanically isolating transmission element has its receiving part connected to an earth fault transmission circuit which is connected to the control device of the elevator, whereby the control device is configured to control the first and/or second semiconductor switch depending on the signal of the earth fault transmission circuit.

Hereinafter for the sake of clarity, the invention is described via the use of a DC/DC converter as preferred embodiment of a galvanically separating link element and with an opto-coupler as preferred embodiment of a galvanically isolating transmission element, although these examples should not be limiting the invention.

Furthermore, the control device might preferably be configured to terminate the current drive of the elevator car in case an earth fault is indicated to the control device via the earth fault transmission circuit. Preferably in this case the control device receives the input signal of a location sensor of the elevator car for example a door zone sensor, and is configured to terminate the current drive only after the car has arrived at the landing zone and the car doors have been opened. Via this measure, the passengers are not trapped in the car. Preferably, in this case the control device is configured to prevent a restart of the elevator by switching off the semiconductor switches Q1 and Q2. Via this measure, a soft manner of taking the elevator out of service is provided as an earth fault is not such a severe fault which necessitates an immediate standstill of the elevator car independent of its position in the elevator shaft, risking the trapping of passengers. By prohibiting a further travel of the elevator car after it has stopped the car can be put out of service until the problem is solved. Thus, it is possible to release all passengers so that any emergency ride or passenger rescue action is not necessary which could be the case when the semiconductor switches would be switched off immediately after finding an earth fault and on the other hand it is ensured that the further use of the faulty elevator does not lead to dangerous situations.

Principally it would be sufficient to switch only one of the semiconductor switches off. Anyway, a higher degree of safety is provided if both semiconductor switches are switched off. In this case, preferably, the control device is configured to switch off the first semiconductor switch before the second semiconductor switch. Via this measure, the first semiconductor switch which is preferably a PWM controlled semiconductor switch for providing the alternating current for the DC/DC converter cuts off the alternating current of the DC/DC converter allowing inductive current of the brake coil/circuit to discharge through the transformer secondary. This causes the inductive brake coil/circuit current to freewheel causing slow and noiseless engagement/gripping of the brake. When the second semiconductor switch would be shut down before the first semiconductor switch, the inductive brake coil/circuit current is discharged to a varistor, engaging/gripping the brake faster." or " . . . first semiconductor switch, the inductive brake coil/circuit current is discharged faster, resulting faster engagement/gripping of the brake.

Preferably, the safety device is connected with a location sensor of the elevator car and the control device is configured to switch off the first and/or second semiconductor switch only after the location sensor senses the elevator having arrived at a door zone. The location sensor is preferably a door zone sensor of the elevator.

In a preferred embodiment of the invention, the earth fault indication circuit comprises a diode in series with the transmitting part of the opto-coupler which transmitting part is also preferably an LED. Opto-couplers are cheap isolating components which do not require separate power supplies to work as digital isolators or operational amplifiers would. Also, opto-coupler provides galvanic isolation. Also, in this case, the processor reading the earth fault LED information is in different potential, (DC-link), than earth. If the brake control processor would be connected to earth potential (PELV), then there would be no need for opto-coupler at all.

An earth fault could alternatively also be detected by replacing an opto-coupler with a resistor divider circuit and by measuring the voltage in that circuit. Fault current would cause a voltage that can be sensed and considered as earth fault. This voltage sensing could be digital or analog.

In a preferred embodiment of the invention, the earth fault indication circuit comprises a resistor in series with the transmitting part of the opto-coupler which resistor has a higher resistance than the brake coil. The earth fault indication circuit should only act as an indicator of an earth fault and should not draw the brake circuit to ground. Thus, a resistor with a preferably higher resistance than the brake coil is used whereby the resistance of the resistor is preferably at least 10 times, preferably at least 100 times as high as the resistance of the brake coil. In practice, preferably a value between 1 kΩ, more preferably 10 kΩ and 200 kΩ is used for the resistor which allows enough current flow to operate the transmitting part of the opto-coupler but which also delimits the current flow to values not harming any components in the earth fault indication circuit and still isolating the brake circuit against earth. This earth fault detection circuit works only when DC/DC converter provides a voltage to secondary-side and when the transistor Q2 is open. Thus, the easiest way to detect the earth fault is at start before transistor Q2 is closed or at stop before transistor Q2 is opened. However, due to the high inductance and slowness of the brake itself, earth fault could be detected also during run by opening transistor Q2 for very short period of time (<50 ms) during which earth fault LED would be lit if there was an earth fault.

Preferably, the first semiconductor switch is a PWM controlled transistor, which is configured to be controlled to generate the necessary intermitting (AC like) voltage for the DC/DC converter to work, which DC/DC converter is regularly a transformer.

Preferably, a varistor is used for clamping brake coil voltage and dropping the brake faster in case transistor Q2 is opened. In normal stops, DC/DC converter is switched off and Q2 is kept closed for short period to allow inductive current to decay through the transformer secondary. This causes brake coil current to freewheel causing slow and noiseless dropping of the brake pads. So varistor is used to engage/grip the brake faster.

Preferably, the rectifying element comprises at least one diode connected in series with the brake coil as well as one capacitor connected parallel to the brake coil. This is the most simple and effective way to provide a DC voltage in the brake circuit for the brake coil. The ripple in the DC voltage is thereby reduced with the capacitor.

The present invention also relates to a method for handling an earth fault in the brake circuit of an elevator and a use of an elevator according to the above-mentioned specification. According to the invention, in case an earth fault is indicated in the brake circuit, the control device waits with the switching off of the semiconductor switches in the first and secondary side of the DC/DC converter until a location sensor of the elevator indicates that the elevator car has arrived, preferably until it has stopped in a door zone. This method provides a soft handling of a brake circuit earth fault in a way that a current elevator ride is allowed to arrive at the next landing before the semiconductor switches are turned off to keep the elevator car immovable at the door zone. Via this measure, the elevator operation can be made smoother as no emergency rides or the release of trapped passengers in the car have to be provided in case an earth fault is detected in the brake circuit.

Preferably, the control device is configured to prevent a re-start of the elevator after having received an earth fault signal from the earth fault transmission circuit. Via this measure, the elevator can be kept out of service until the earth fault problem is solved. This enhances the safety of the elevator system.

The invention also relates to a method for operating an elevator in an earth fault condition of the brake circuit using an elevator according to the above specifications. According to the inventive method after having received an earth fault signal from the earth fault transmission circuit the control device drives the elevator car to the next landing, so that the passengers are able to leave the car.

Preferably, in this case after having driven the car to the landing a restart of the car is prevented. Via this measure it is ensured that the elevator stays out of service until the earth fault problem is solved. Preferably in case of an earth fault signal a maintenance signal can be issued to a remote maintenance centre for the elevator, so that immediately measures can be taken to solve the earth fault problem.

It is clear for the skilled person that the above-mentioned embodiments can be combined with each other arbitrarily.

It is further clear for the skilled person that single components mentioned in the invention can be provided as a single component or as a multitude of components. Furthermore, the control device may be or may comprise a safety device of the elevator. The safety device may for example be integrated with the control device or it may be a separate part from the control device of the elevator. The elevator may be a stand-alone elevator or an elevator being part of an elevator system, e.g. an elevator group or multi-group.

According to a preferred inventive method which is performed during a stop of the elevator car following steps are performed: First the first semiconductor switch Q1 is controlled to supply power to the secondary side of the DC/DC converter, e.g. by PWM control and the second semiconductor switch Q2 is controlled off, then, if the earth fault transmission circuit (27) does not indicate an earth fault, the second semiconductor switch Q2 is controlled on.

In case of the earth fault is detected, the first semiconductor switch Q1 is controlled off and the elevator is prevented to start. The primary use case is preferably just before the elevator travel or right after the travel when the elevator car is at landing zone. Here, the earth fault detection can be safely performed during still-stand of the elevator car.

In an alternative inventive method which is performed during movement of the elevator car following steps are performed: First the first semiconductor switch Q1 is controlled to supply power to the secondary side of the DC/DC converter, e.g. by PWM control, and the second semiconductor switch Q2 is controlled on, then the second semiconductor switch Q2 is switched off for a limited period, which is short enough not to engage the brake, the presence of an earth fault is monitored via the earth fault transmission circuit (27) then the second semiconductor switch Q2 is switched back on irrespective of the presence of the earth fault before the brake engages and the elevator is controlled to travel to its destination. Here, the car is driven to its destination, even if an earth fault is detected. Only the further use of the elevator car is prevented after it has reached its destination. This avoids any trapping of passengers, in case of an earth fault detection and the earth fault monitoring can be performed even during run of the elevator.

Following terms are used as synonyms: control device—safety device; galvanically isolating transmission element—opto-coupler; galvanically separating link element—DC/DC converter; emitting—transmitting; sensing—receiving;

BRIEF DESCRIPTION OF THE DRAWINGS

These and/or other aspects will become apparent and more readily appreciated from the following description of example embodiments, taken in conjunction with the accompanying drawings of which:

FIG. 1 shows a schematic diagram of an elevator having an earth fault detection in the brake circuit.

DETAILED DESCRIPTION

FIG. 1 shows the schematic diagram of a brake drive 11 of the elevator brake, which brake drive 11 is connected to the two terminals DC+, DC− of a DC link which is part of a frequency converter of an elevator motor drive, whereby the DC link is provided between a rectifier bridge and an inverter bridge. The rectifier bridge is connected with AC mains and the inverter bridge is connected with the elevator motor, eventually via switches or contactors.

According to the invention, the brake drive 11 comprises a DC/DC converter 10 which is connected via a first semiconductor switch Q1 of the brake drive with the terminals DC+, DC− of the DC link. The secondary side of the DC/DC converter 10 forms part of a brake circuit 20 of the brake drive 11. The secondary part of the DC/DC converter 10 is thus connected to a brake coil 12 of the elevator brake via a rectifying diode 14 and a second semiconductor switch Q2. Parallel to the brake coil 12, a smoothing capacitor 16 as well as varistor 18 in series with a second diode 19 is connected, whereby the smoothing capacitor 16 reduces the DC voltage ripple in the brake circuit 20 which is formed by all the above-mentioned components connected with the secondary side of the DC/DC converter 10. The varistor 18 is used for clamping the brake coil voltage and dropping the brake faster in case transistor Q2 is opened. In normal stops, DC/DC converter is switched off and Q2 is kept closed for short period to allow inductive current to decay through the transformer secondary. This causes brake coil current to freewheel causing slow and noiseless dropping of the brake pads. Furthermore, an earth fault indicator circuit 22 is connected between the brake circuit 20 and earth whereby the earth fault indicator circuit comprises an LED 24 as the transmitting part of an opto-coupler 26 in series with a resistor 23. The resistor has a resistance higher than that of the brake coil 12, preferably at least by a factor 10, preferably at least by a factor 100, so that the value is preferably in a range of 1 kΩ to 500 kΩ. Thus, the brake circuit is sufficiently isolated against earth. The receiving or sensing part 28 of the opto-coupler 26 forms an earth fault transmission circuit 27, which is connected to the control device 40. The control device 40 may be or may comprise or may be connected to a safety device 30 of the elevator. The control device 40 is further connected to the control gates of both semiconductor switches Q1 and Q2 which semiconductor switches may preferably be transistors. The control device 40 is further connected with a location sensor 32 of the elevator car, for example a door zone sensor, so that the control device 40 or safety device 30 gets information when an elevator car arrives or stops in a door zone. The invention works as follows:

In case the brake circuit 20 has an earth fault which is indicated by the broken lines 34a, 34b, and the semiconductor switch Q2 is controlled off (not to conduct), this immediately leads to a current flow in the earth fault indication circuit 22 which leads to an emission of the LED 24 of the opto-coupler 26. Via the receiving part 28 of the opto-coupler 26, the control or safety device activates a delay circuit 36 which is connected to the input of the location sensor and of the earth fault transmission circuit in a kind of AND link so that only when also the location sensor indicates that the elevator car has stopped, is stopping or has arrived at a door zone, the safety device 30 or control device 40 is allowed to shut down the first semiconductor switch Q1 and/or the second semiconductor switch Q2. Preferably, the control device 40/safety device 30 has a succession circuit 38 which leads in case of the shutting down of the brake circuit first to the shutting down of the first semiconductor switch Q1 and only afterwards of the second semiconductor switch Q2. This leads to the shutting down of the DC/DC converter in such a way that the brake is engaged/gripped slowly and silently.

The presence of an earth fault in the brake circuit 20 can be monitored before an elevator travel by controlling the first semiconductor switch Q1 to power the brake circuit 20 while the second semiconductor switch Q2 is off. In another embodiment, the presence of an earth fault can be monitored after an elevator travel by controlling the second semiconductor switch Q2 off while still powering the brake circuit 20 by controlling the first semiconductor switch Q1. Also, in another embodiment the presence of an earth fault can be monitored during the elevator travel by controlling the second semiconductor switch Q2 off and then back on. The period when the second semiconductor switch Q2 is off is less than the time required for the brake to engage/grip, preferably less than 50 milliseconds. (This depends on the inertia/mass of the brake system.) Hence, this can be performed during the elevator travel.

The invention thus allows a very reliable and simple mechanism of detecting an earth fault in the brake circuit as well as to provide the necessary measures to take the elevator smoothly out of service, preferably after having driven the elevator car to a nearby door zone.

In a preferred embodiment, the safety device could indicate to the control device 40 of the elevator to drive the elevator car to the next landing in travelling direction so as to reduce the length of the elevator travel after having detected the earth fault in the brake circuit.

The invention is not restricted to the disclosed embodiment but may be varied within the scope of the attached patent claims.

LIST OF REFERENCE NUMBERS 10 galvanically separating link component—DC/DC converter
11 brake drive
12 brake coil
14 rectifying diode
16 smoothing capacitor
18 varistor
19 second diode
20 brake circuit 21 third diode in the earth fault indicator circuit
22 earth fault indicator circuit
23 resistor of the earth fault indication circuit, preferably with a resistance in the kΩ area
24 LED—transmitting part of opto-coupler
26 galvanically isolating transmission element—opto-coupler
27 earth fault transmission circuit
28 receiving part of opto-coupler
30 safety device
32 location sensor
34a,b earth fault connections
36 delay circuit
38 succession circuit
40 control device
Q1 first semiconductor switch—first transistor, particularly PWM modulated
Q2 second semiconductor switch—second transistor

The invention claimed is:

1. A brake drive of an elevator the brake drive comprising:
a galvanically separating link component having a primary side and a secondary side, the primary side connected to a DC link between a rectifier bridge and an inverter bridge;
a brake circuit connected to the secondary side of the galvanically separating link component, the brake circuit including at least one brake coil of an elevator brake and at least one rectifying element;
a first semiconductor switch connected to the primary side of the galvanically separating link component;
a second semiconductor switch;
an earth fault indication circuit connected between the brake circuit and earth, the earth fault indication circuit including a transmitting part and a receiving part;
an earth fault transmission circuit configured to generate an earth fault signal in response to the earth fault indication circuit indicating an earth fault in the brake circuit; and
a control device configured to determine if the earth fault is present in brake circuit by first switching on at least the first semiconductor switch to supply power to the secondary side of the galvanically separating link component, second switching off the second semiconductor switch for at least a set period of time, and determining whether the earth fault is present based on whether the earth fault signal of the earth fault transmission circuit is received from the earth fault transmission circuit.

2. The brake drive of claim 1, wherein the galvanically separating link component is a DC/DC converter.

3. A brake drive of an elevator the brake drive comprising:
a galvanically separating link component having a primary side and a secondary side, the primary side connected to a DC link between a rectifier bridge and an inverter bridge;
a brake circuit connected to the secondary side of the galvanically separating link component, the brake circuit including at least one brake coil of an elevator brake and at least one rectifying element;
a first semiconductor switch connected to the primary side of the galvanically separating link component;
a second semiconductor switch;
an earth fault indication circuit connected between the brake circuit and earth, the earth fault indication circuit including a transmitting part and a receiving part;
an earth fault transmission circuit configured to generate an earth fault signal in response to the earth fault indication circuit indicating an earth fault in the brake circuit; and
a control device configured to control one or more of the first semiconductor switch and the second semiconductor switch by switching on/off the first semiconductor switch and the second semiconductor switch based on the earth fault signal of the earth fault transmission circuit.

4. The brake drive of claim 1, wherein the earth fault indication circuit comprises:
an opto-coupler.

5. The brake drive of claim 4, wherein the transmitting part of the opto-coupler is a LED.

6. The brake drive of claim 1, wherein the earth fault indication circuit comprises:
a diode in series with the transmitting part.

7. The brake drive of claim 1, wherein the earth fault indication circuit comprises:
a resistor in series with the transmitting part, a resistance of the resistor being greater than a resistance of the brake coil.

8. The brake drive of claim 7, wherein the resistance of the resistor is at least ten times the resistance of the brake coil.

9. The brake drive of claim 1, wherein the first semiconductor switch is PWM controlled.

10. The brake drive of claim 1, wherein the brake circuit further comprises:
a varistor connected in parallel to the brake coil.

11. The brake drive of claim 10, wherein the brake circuit further comprises:
a diode is connected in series with the varistor.

12. The brake drive of claim 1, wherein the at least one rectifying element comprises:
one or more of a diode and a smoothing capacitor.

13. The brake drive of claim 1, wherein the control device is connected to a location sensor of an elevator car in an elevator shaft, and the control device comprises:
a delay circuit configured to, in response to the earth fault signal from the earth fault transmission circuit, delay switching off of the first semiconductor switch and the second semiconductor switch until the elevator car reaches a door zone of the elevator.

14. The brake drive of claim 1, wherein the control device is configured to prevent a re-start of the elevator in response to the earth fault signal from the earth fault transmission circuit.

15. A method for operating a brake drive of an elevator, the brake drive including a galvanically separating link component having a primary side and a secondary side, the primary side connected to a DC link between a rectifier bridge and an inverter bridge, a brake circuit connected to the secondary side of the galvanically separating link component, the brake circuit including at least one brake coil of an elevator brake and at least one rectifying element, a first semiconductor switch connected to the primary side of the galvanically separating link component; a second semiconductor switch, an earth fault indication circuit connected between the brake circuit and earth, the earth fault indication circuit including a transmitting part and a receiving part, an earth fault transmission circuit and a control device configured to control one or more of the first semiconductor switch and the second semiconductor switch, the method comprising:

first switching on at least the first semiconductor switch to supply power to the secondary side of the galvanically separating link component;

second switching off the second semiconductor switch for at least a set period of time;

determining whether an earth fault is present in the brake circuit based on whether an earth fault signal is received from the earth fault transmission circuit; and selectively driving an elevator car to a next landing after receiving the earth fault signal from the earth fault transmission circuit.

16. The method according to claim 15, further comprising:

preventing a re-start of the elevator car after driving the elevator car to the next landing.

17. The method according to claim 15, further comprising:

third switching on the second semiconductor switch in response to the determining that the earth fault is not present, wherein
  the selectively driving the elevator car includes switching off the first semiconductor switch to prevent the elevator car from starting, in response to determining that the earth fault is present when the elevator car is stopped at a current landing.

18. The method according to claim 15, wherein the first switching includes switching on both the first semiconductor switch and the second semiconductor switch, the second switching switches off the second semiconductor switch for the set period of time shorter than a time to engage the elevator brake, and the method further comprises:

third switching the second semiconductor switch back on irrespective of whether the earth fault is present before the elevator brake engages such that the elevator car is controlled to travel to its a destination.

19. The brake drive of claim 1, wherein the control device is further configured to, drive an elevator car to a next landing, after receiving the earth fault signal from the earth fault transmission circuit, and switch off the first semiconductor switch to prevent the elevator car from starting, after driving the elevator car to the next landing.

20. The brake drive of claim 1, wherein the control device is configured to first switch on both the first semiconductor switch and the second semiconductor switch, second switch off the second semiconductor switch, and third switch the second semiconductor switch back on after the set period of time irrespective of whether the earth fault is present, the set time period being shorter than a time to engage the elevator brake such that the second semiconductor switch is switched back on before the elevator brake engages such that an elevator car is controlled to travel to a destination.

* * * * *